(12) United States Patent
Battaglia et al.

(10) Patent No.: US 10,926,597 B2
(45) Date of Patent: *Feb. 23, 2021

(54) SUSPENSION AND POWERTRAIN UNIT FOR AN ELECTRIC VEHICLE, WITH BRAKE DISCS AT A REMOTE POSITION WITH RESPECT TO THE WHEELS

(71) Applicant: FCA Italy S.p.A., Turin (IT)

(72) Inventors: Gaetano Battaglia, Turin (IT); Daniele Bruno, Turin (IT); Luca Dusini, Turin (IT); Fabio Gerbino, Turin (IT)

(73) Assignee: FCA Italy S.p.A., Turin (IT)

( * ) Notice: Subject to any disclaimer, the term of this patent is extended or adjusted under 35 U.S.C. 154(b) by 66 days.

This patent is subject to a terminal disclaimer.

(21) Appl. No.: 16/296,474

(22) Filed: Mar. 8, 2019

(65) Prior Publication Data

US 2019/0283518 A1 Sep. 19, 2019

(30) Foreign Application Priority Data

Mar. 13, 2018 (EP) ..................................... 18161417

(51) Int. Cl.
*B60G 11/50* (2006.01)
*B60G 3/20* (2006.01)
(Continued)

(52) U.S. Cl.
CPC ................ *B60G 11/50* (2013.01); *B60G 3/20* (2013.01); *B60G 11/08* (2013.01); *B60K 7/0007* (2013.01);
(Continued)

(58) Field of Classification Search
CPC . B60K 17/04; B60K 7/00; B60G 3/20; B60G 11/08
(Continued)

(56) References Cited

U.S. PATENT DOCUMENTS 2,674,450 A * 4/1954 Frank ................. B60G 21/0551
267/189
5,348,334 A * 9/1994 Giltinan ................... B60G 3/20
280/124.138
(Continued)

FOREIGN PATENT DOCUMENTS

DE 102010017991 A1 * 10/2011 ......... B60G 21/0551
DE 102010017991 A1 10/2011
(Continued)

OTHER PUBLICATIONS

Translation of DE-102010017991-A1 accessed at www.espacenet.com on Jun. 22, 2020. (Year: 2011).*
European Search Report dated Sep. 11, 2018. 3 pages.

*Primary Examiner* — James A Shriver, II
*Assistant Examiner* — Hilary L Johns
(74) *Attorney, Agent, or Firm* — RMCK Law Group, PLC

(57) ABSTRACT

An electric vehicle includes a suspension and powertrain unit having a vehicle frame module, an electric motor unit carried by the frame module centrally between two wheels and a suspension including, for each wheel, an upper oscillating arm and a lower oscillating arm carrying a respective wheel support. Each wheel support rotatably supports a respective wheel hub connected to the electric motor unit by a respective drive shaft. Brake discs are mounted on two output shafts of the electric motor unit, at a distance from the respective wheels, and are connected by drive shafts to the hubs of the two wheels. Thanks to the absence of brake discs adjacent to the wheel hubs, swivel joints connecting each wheel support to the respective upper and lower arms can be arranged so as to define a steering axis passing through a respective wheel center and thereby having a substantially zero kingpin offset.

9 Claims, 15 Drawing Sheets

Figure 1:
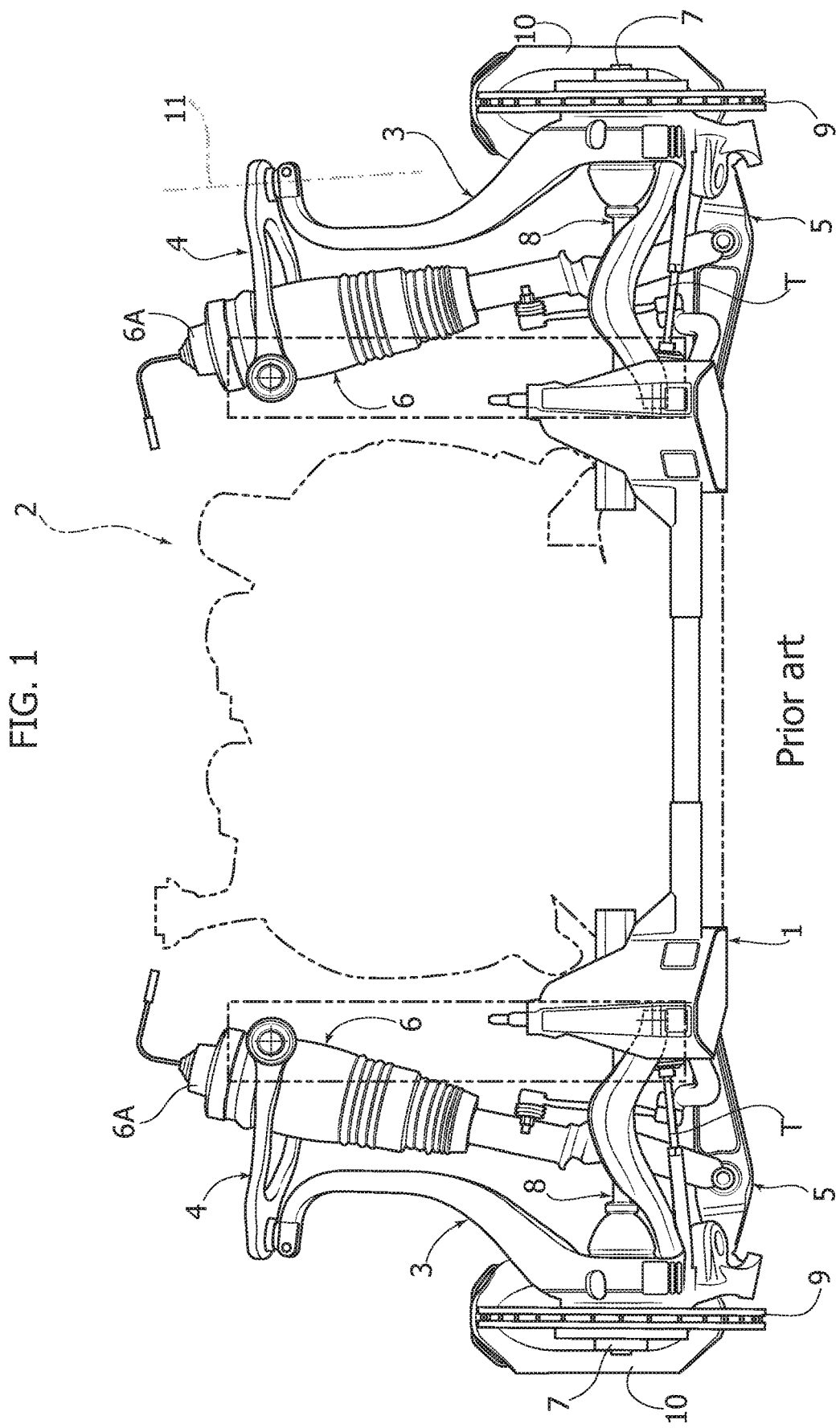

(51) Int. Cl.
*B60G 11/08* (2006.01)
*B60K 7/00* (2006.01)
*B60K 17/04* (2006.01)
*B60G 17/04* (2006.01)
*B60G 21/00* (2006.01)
*B60K 17/356* (2006.01)
*B60K 17/354* (2006.01)

(52) U.S. Cl.
CPC ........ *B60K 17/043* (2013.01); *B60G 17/0416* (2013.01); *B60G 21/005* (2013.01); *B60G 2200/144* (2013.01); *B60G 2200/154* (2013.01); *B60G 2200/422* (2013.01); *B60G 2200/44* (2013.01); *B60G 2202/114* (2013.01); *B60G 2202/12* (2013.01); *B60G 2202/312* (2013.01); *B60G 2202/42* (2013.01); *B60G 2204/121* (2013.01); *B60G 2204/13* (2013.01); *B60G 2204/15* (2013.01); *B60G 2204/40* (2013.01); *B60G 2204/422* (2013.01); *B60G 2300/50* (2013.01); *B60G 2500/10* (2013.01); *B60G 2500/30* (2013.01); *B60K 17/354* (2013.01); *B60K 17/356* (2013.01); *B60K 2007/0046* (2013.01); *B60K 2007/0061* (2013.01)

(58) Field of Classification Search
USPC ...................................................... 280/124.1
See application file for complete search history.

(56) References Cited

U.S. PATENT DOCUMENTS

| | | | | |
|---|---|---|---|---|
| 5,364,114 A | * | 11/1994 | Petersen | .................. B60G 3/20 |
| | | | | 267/248 |
| 8,991,530 B2 | * | 3/2015 | Langer | ..................... B60K 1/04 |
| | | | | 180/65.1 |
| 9,517,673 B2 | * | 12/2016 | Izak | ....................... B60G 11/56 |
| 2011/0259657 A1 | * | 10/2011 | Fuechtner | ............... B60K 6/52 |
| | | | | 180/65.21 |
| 2013/0241167 A1 | * | 9/2013 | Perri | ..................... B60G 11/08 |
| | | | | 280/124.134 |
| 2016/0016451 A1 | | 1/2016 | Izak | |
| 2017/0137023 A1 | * | 5/2017 | Anderson | ............. B60W 50/14 |

FOREIGN PATENT DOCUMENTS

| | | |
|---|---|---|
| DE | 102014102541 A1 | 8/2015 |
| DE | 102014205635 A1 | 10/2015 |
| FR | 2972169 A1 | 9/2012 |
| JP | H04121215 A | 4/1992 |
| JP | H05270228 A | 10/1993 |

* cited by examiner

SUSPENSION AND POWERTRAIN UNIT FOR AN ELECTRIC VEHICLE, WITH BRAKE DISCS AT A REMOTE POSITION WITH RESPECT TO THE WHEELS

CROSS-REFERENCE TO RELATED APPLICATION

This application claims priority to European Patent Application No. 18 161 417.3 filed Mar. 13, 2018. The disclosure of the above application is incorporated herein by reference in its entirety.

FIELD OF THE INVENTION

The present invention relates to electric vehicles of the type comprising a suspension and powertrain unit which includes:
a frame module,
an electric motor unit carried by said frame module at a central position between two wheels, and
a suspension including, for each wheel:
an upper oscillating arm and a lower oscillating arm, each having a first end portion swivelly connected to a respective wheel support by a first swivel joint and a second end portion swivelly connected to the frame module by at least one second swivel joint, so that each wheel support is rotatable around a steering axis defined by the swivel joints connecting the wheel support to the upper and lower arms,
in which each wheel support rotatably supports a respective wheel hub which is coupled to said electric motor unit by a respective drive shaft,
and in which two brake discs are connected in rotation with the two wheel hubs.

PRIOR ART

FIG. 1 of the annexed drawings is a front view of the powertrain unit and the front suspension of a conventional vehicle provided with an internal combustion engine and the associated transmission. In this figure, reference numeral 1 generally designates the structure of the vehicle, on which an internal combustion engine 2 is supported. The example shown relates to the case in which the suspension subunit associated with each wheel comprises a wheel support 3 connected to the structure 1 of the motor-vehicle by an upper oscillating arm 4 and two lower oscillating arms 5. Between one of the lower arms 5 and the vehicle structure there is operatively interposed a spring-damper unit 6. Each wheel support 3 rotatably supports a wheel hub 7 which is driven in rotation by the powertrain unit 2 through a driveshaft 8. As shown in FIG. 1, the two spring-damper units are arranged according to a substantially vertical orientation at the two sides of the powertrain unit 2. This arrangement of course poses some limits to the possibility of reducing the vertical dimension of the entire unit, given that the upper ends 6A of the spring-damper units must be arranged at a relatively elevated level with respect to the wheel axes. Still with reference to FIG. 1, numeral 9 designates the brake disc associated with each wheel hub 7. With each brake disc 9 there is associated a brake caliper 10 which is mounted on the wheel support 3. The swivel joints connecting each wheel support 3 to the upper and lower arms 4,5 define a wheel steering axis 11. In order to arrange the steering axis 11 as much close as possible to the wheel centre, for reasons which will be clarified more in detail in the following, the wheel support is configured so as to extend upwardly much above the respective wheel axis, which again poses limits to the possibility of reducing the vertical dimension of the entire suspension unit.

Figure 2:
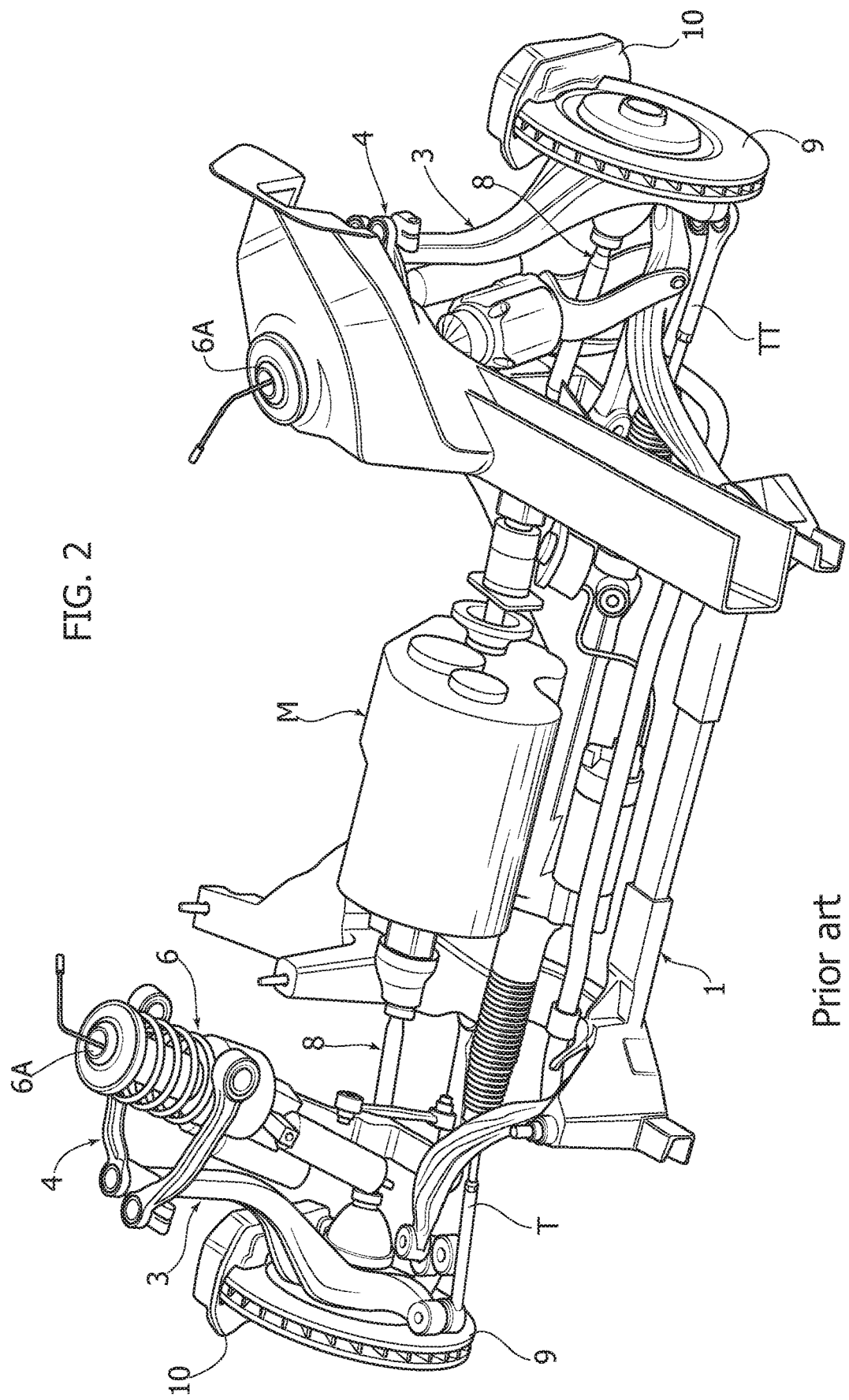

FIG. 2 of the annexed drawings shows a front suspension of an electric vehicle according to the prior art. In this figure, parts identical or corresponding to those of FIG. 1 are designated by the same reference numeral. FIG. 2 shows an example of an electric vehicle obtained by maintaining substantially the same construction of the vehicle suspension of FIG. 1, while replacing the powertrain unit 2, including the internal combustion engine and the transmission unit associated therewith, with an electric motor unit M having two outputs connected by drive shafts 8 to the hubs of the two wheels of the vehicle. As it readily appears from the comparison with FIG. 1, the space occupied inside the engine compartment by the electric motor unit M is considerably reduced with respect to the space occupied by the powertrain unit 2 of FIG. 1. Inspite of this, in the known electric vehicles of the type shown in FIG. 2, the configuration and the arrangement of the wheel supports 3 and the spring-damper units 6 remain substantially similar to those provided in motor-vehicles having an internal combustion engine and therefore generate the same drawbacks which have been mentioned above.

OBJECT OF THE INVENTION

A first object of the invention is that of providing an electric vehicle of the type indicated at the beginning of the present description having an improved suspension construction able to considerably reduce the general dimensions of the suspension, above all in the vertical direction and which also provides a considerable reduction of the stresses to which the components of the suspension are subjected.

A further object of the invention is that of providing an electric vehicle of the above indicated type having a suspension which can be configured so as to have additional functions, such as a suspension active control and/or a vehicle height level control function, without any substantial complication in the assembling of the suspension and without substantially increasing the dimensions of the suspension.

A further preferred object of the invention is that of providing an electric vehicle of the type indicated at the beginning of the present description in which the vehicle can be configured and assembled according to modularity criteria, so as to simplify the production of the vehicle and reduce the production cost.

SUMMARY OF THE INVENTION

In view of achieving one or more of the above indicated objects, the invention provides an electric vehicle having all the features which have been indicated at the beginning of the present description and further characterized in that:
the brake discs are mounted on two output shafts of the electric motor unit, adjacent to the two sides of the electric motor unit and at a distance from the respective wheels, and are connected by said drive shafts to the hubs of the two wheels,
brake calipers cooperating with said brake discs are carried by said frame module adjacent to the two sides of the electric motor unit,
the swivel joints connecting each wheel support to the respective upper and lower arms define a steering axis passing through the respective wheel centre or closely adjacent thereto, that is having a substantially zero kingpin offset.

In the vehicle according to the invention, the relevant space inside the engine compartment deriving from the use of an electric motor unit, in replacement of a conventional internal combustion engine and the transmission thereof, is exploited to arrange the brake discs at remote positions with respect to the wheels. Thanks to the absence of brake discs adjacent to the wheel hubs, it can be obtained that the steering axis of each wheel passes through the wheel centre or is considerably close thereto (substantially zero kingpin offset), without the need of arranging the swivel joints connecting the wheel supports to the upper oscillating arms of the suspension at a very elevated position above the wheel, with the result that the vertical dimension of the entire unit is greatly reduced. Moreover, this result can be obtained with a simplified construction of the suspension, in which the wheel support is connected to a single upper arm by a single swivel joint and to a single lower arm by a single joint.

The arrangement of each steering axis with a zero kingpin offset enables the very high torque of electric motors to be exploited without a risk of shocks on the steering wheel. This arrangement has the further advantage of nullifying the so-called "brake caster" consisting in the variation of the caster angle defined by the steering axis during braking due to the interaction between the wheel support and the brake disc. Also for this reason, the solution according to the invention does not require a "high" suspension quadrilateral linkage with the resulting possibility of reducing the non-suspended masses and making the entire system lighter.

A further advantage derives from that the forces along the vertical direction transmitted to the wheel by the ground are discharged directly at the steering axis, without generating any torque, given that the kingpin offset is zero. In the known solutions, this torque usually causes a need of providing filtering systems, such as elastic bushes of relatively large dimensions, with resulting drawbacks of an increase in weight and cost, and greater layout constraints.

The above mentioned advantage also provides a decrease of the vehicle rolling noise (also called "load noise") since vertical forces on the wheel do not generate forces in a transverse direction which have to be filtered.

In a preferred embodiment, the electric motor unit comprises two electric motors, arranged coaxially along a transverse direction with respect to the longitudinal direction of the vehicle, at spaced apart positions, symmetrically arranged at the two sides of the median line of the vehicle, and two respective gear reducing units arranged centrally between the two electric motors with housings having lateral walls from which respective output shafts project, which carry said brake discs, these output shafts being connected by respective drive shafts to the hubs of the two wheels.

In a preferred embodiment, said suspension and powertrain unit further comprises:
two shock absorber cylinders arranged in substantially horizontal positions and along two directions substantially transversal with respect to the longitudinal direction of the vehicle, below or above the above mentioned electric motor unit,
each shock absorber cylinder has a first end connected to said frame module and the second end operatively connected to one of said upper and lower oscillating arms of the respective wheel by an oscillating linkage member, said oscillating linkage member comprises a first portion pivotally connected to said frame module, a second portion connected to said second end of the respective shock absorber cylinder, and a third portion connected to one of said upper and lower oscillating arms by a respective articulated rod.

Preferably, the suspension comprises spring means in form of a single leaf spring arranged transversely with respect to the longitudinal direction of the vehicle and having a central portion connected to the frame module of the suspension and end portions connected to respective oscillating arms of the suspension.

In a particularly advanced variant, with each shock absorber cylinder there is further associated an actuator device for the suspension active control, and said leaf spring has its central portion carried by the frame module so as to be adjustable in height, so as to enable the height of the vehicle to be adjusted depending upon the way of driving of the driver.

Further optional features of the vehicle according to the invention are indicated in the dependent claims appended herein.

DESCRIPTION OF PREFERRED EMBODIMENTS

Figure 3:
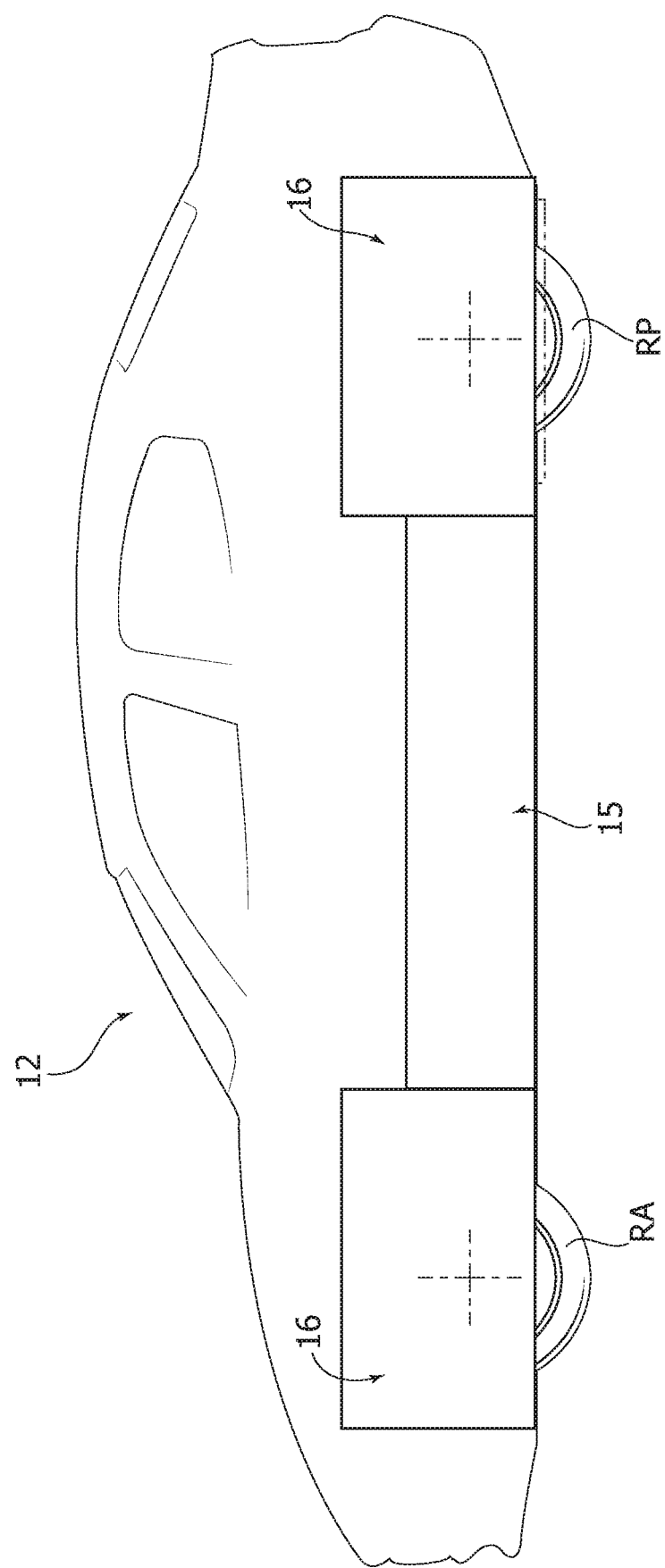
Figure 4:
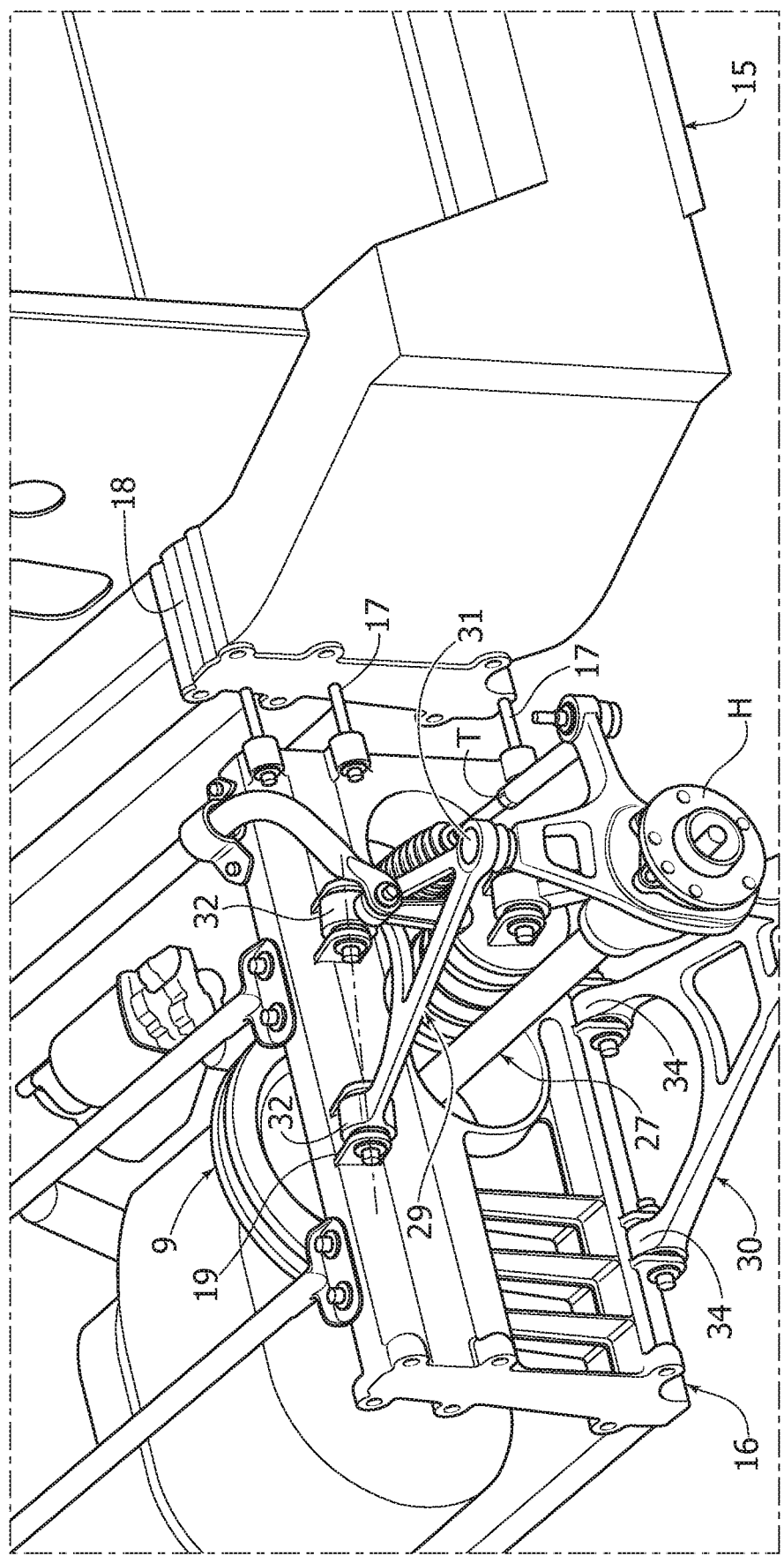
Figure 5:
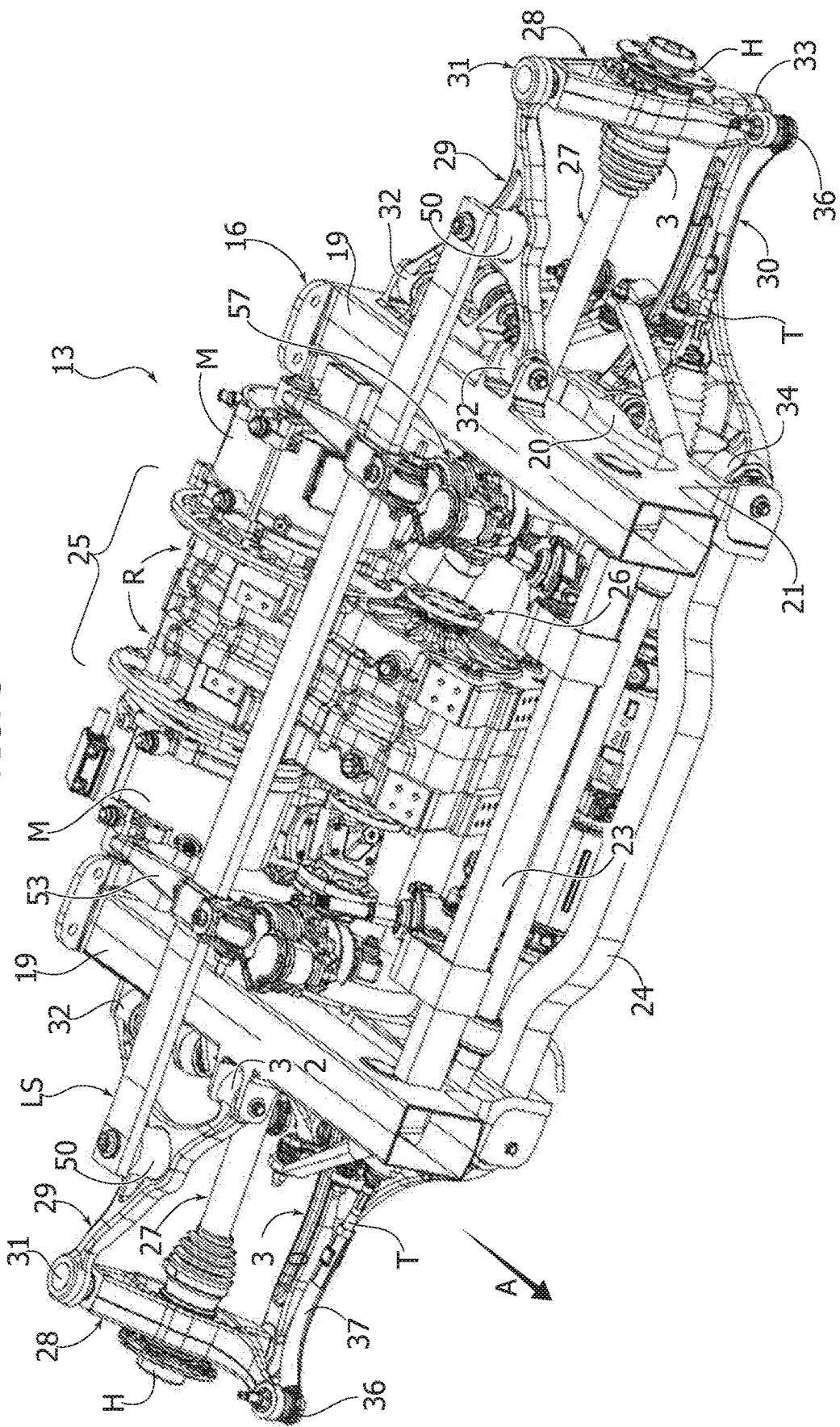
Figure 6:
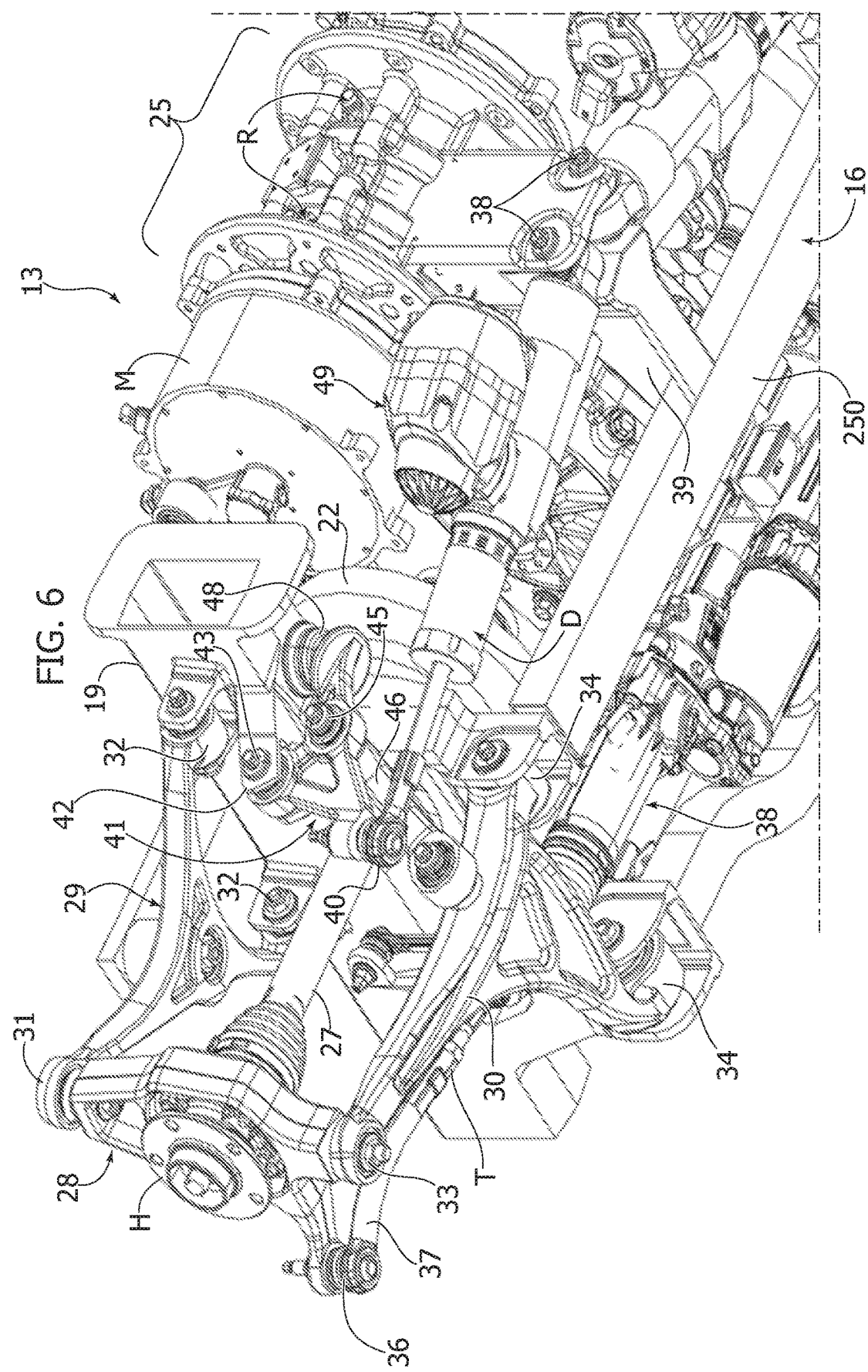
Figure 7:
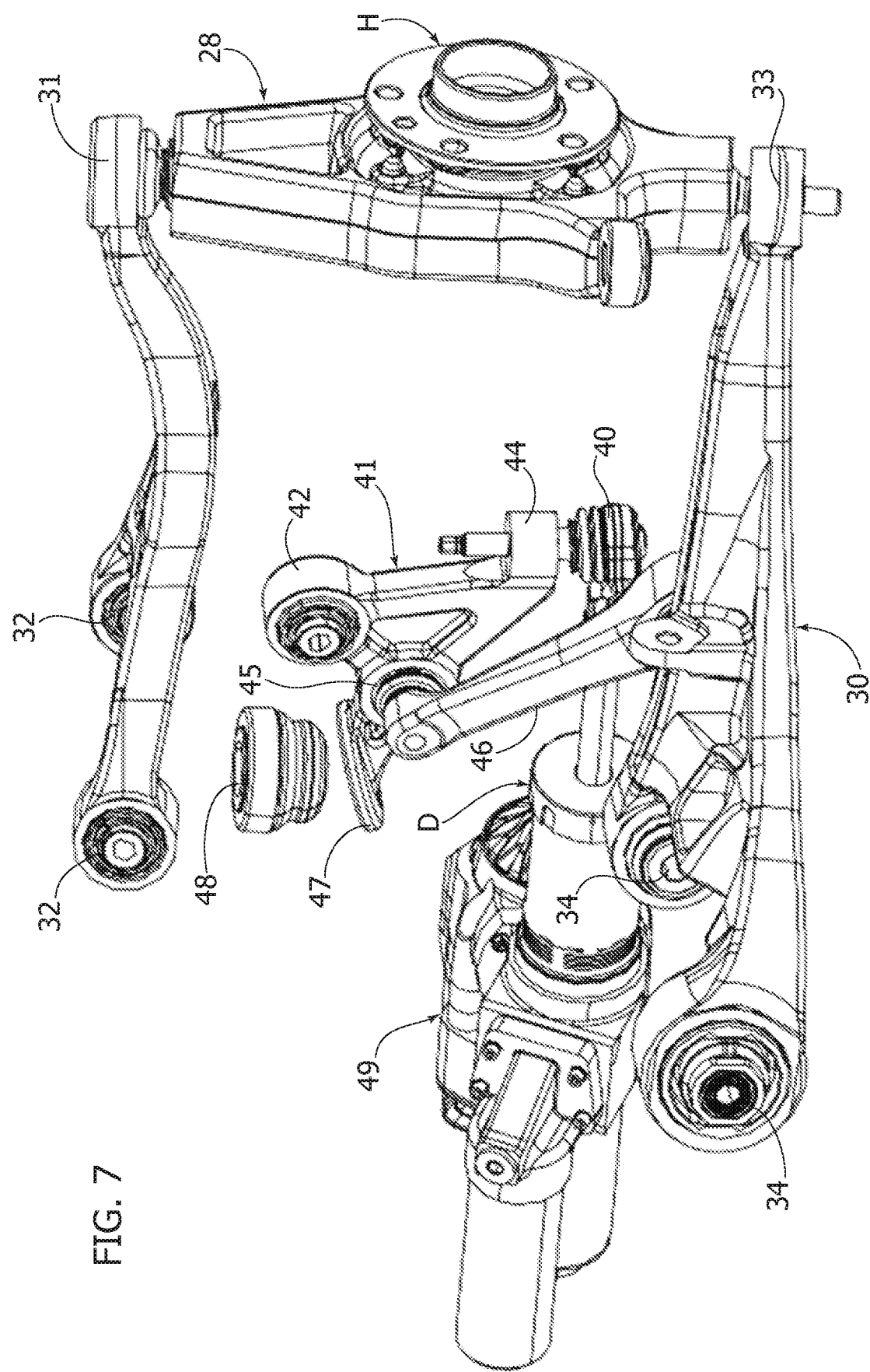
Figure 8:
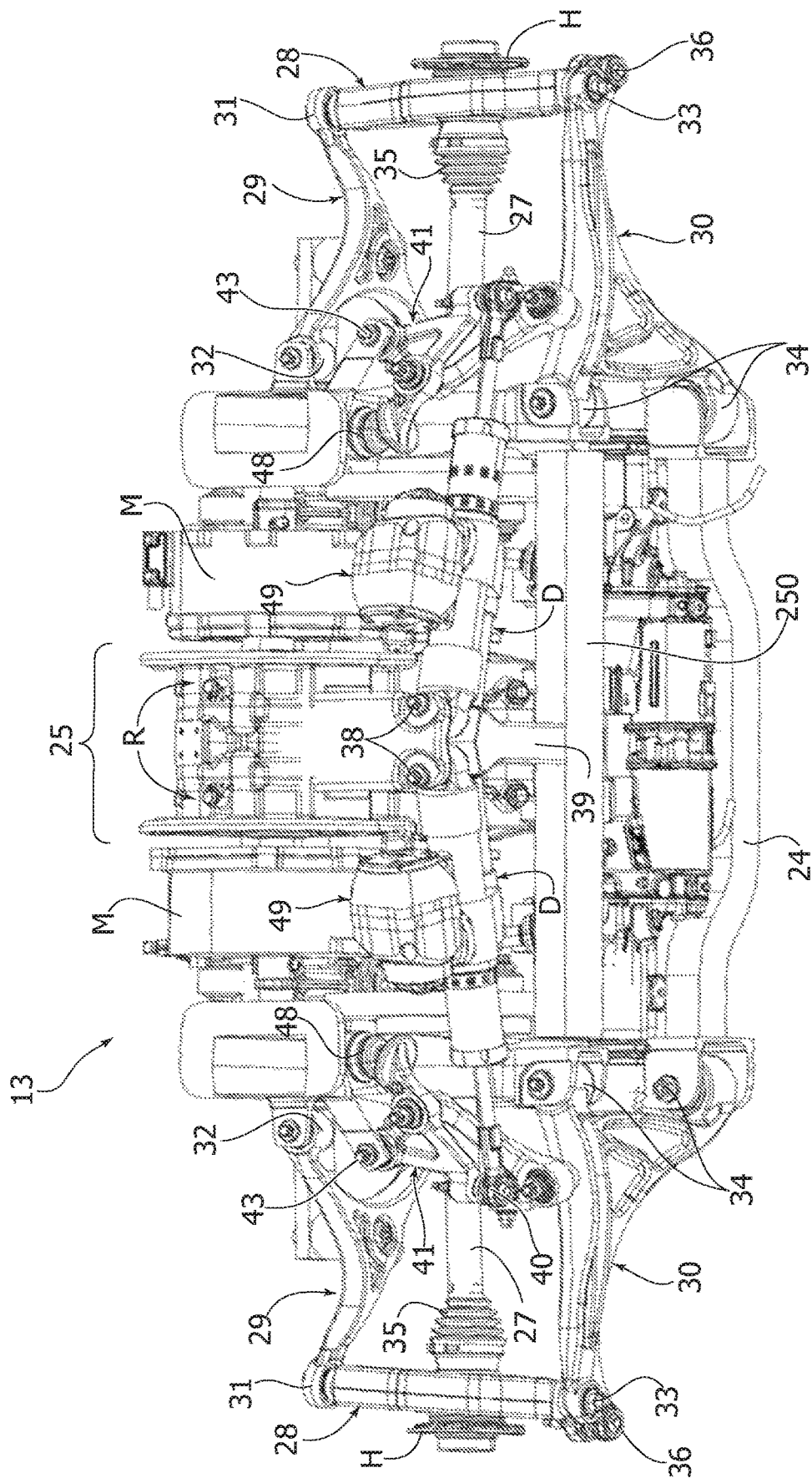
Figure 9:
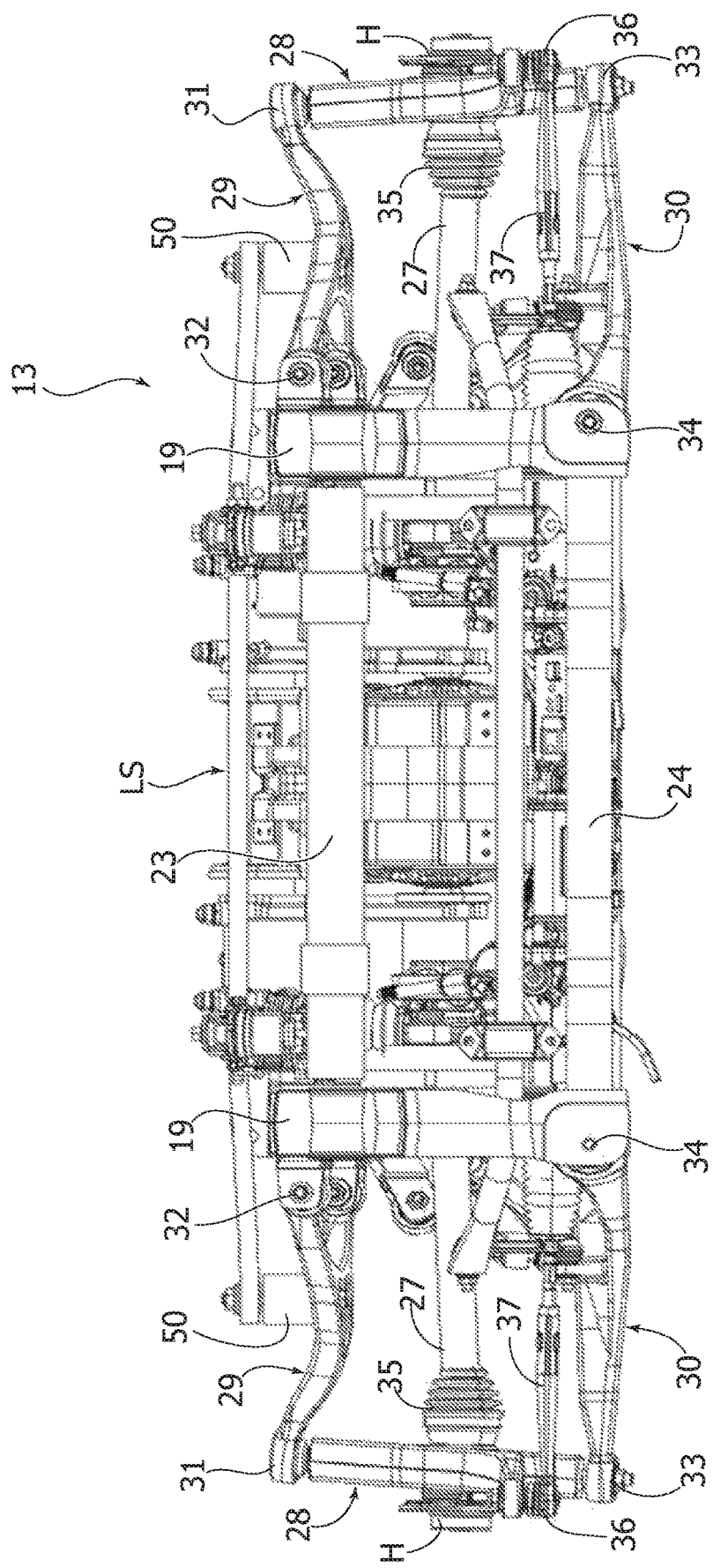
Figure 10:
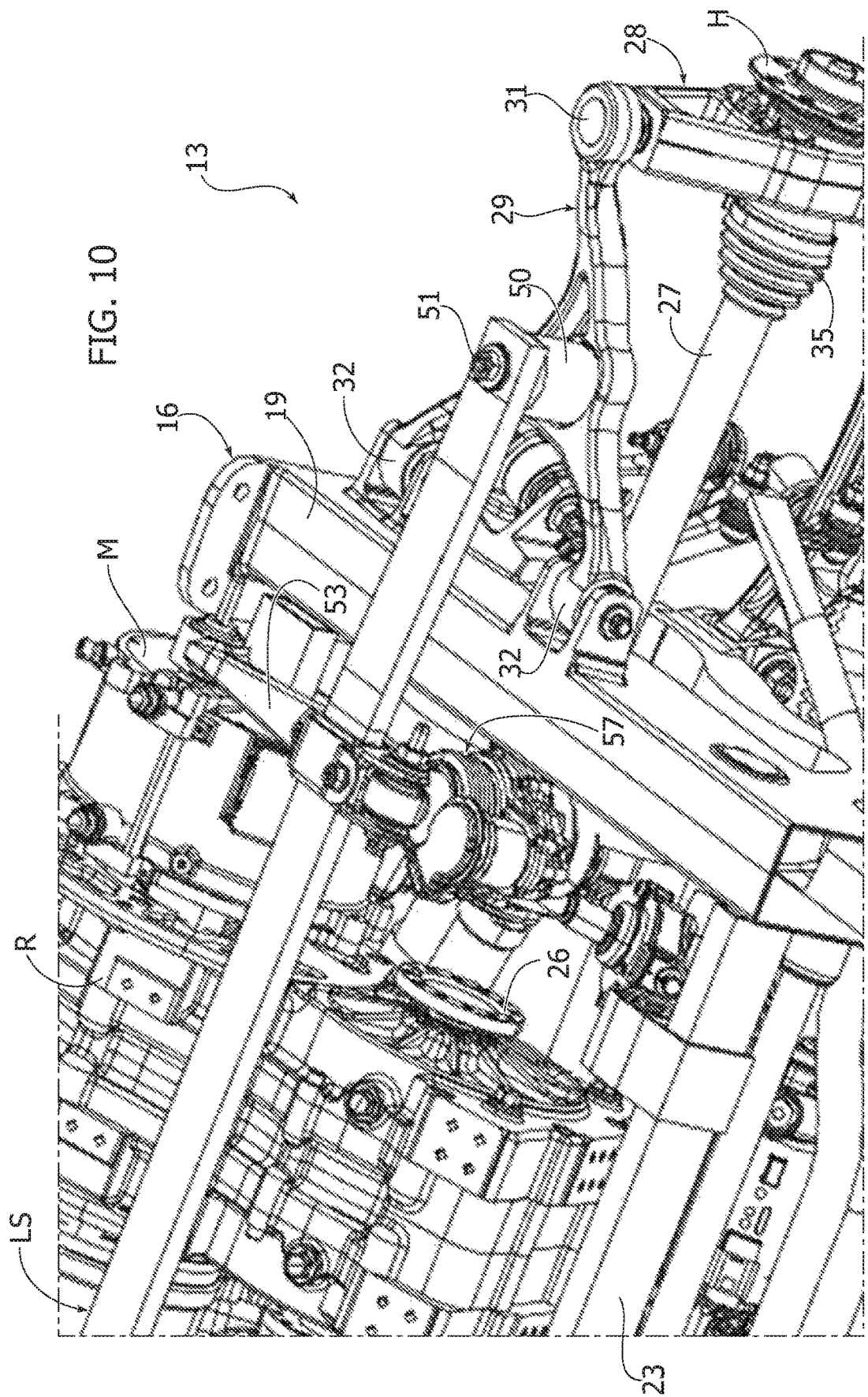
Figure 11:
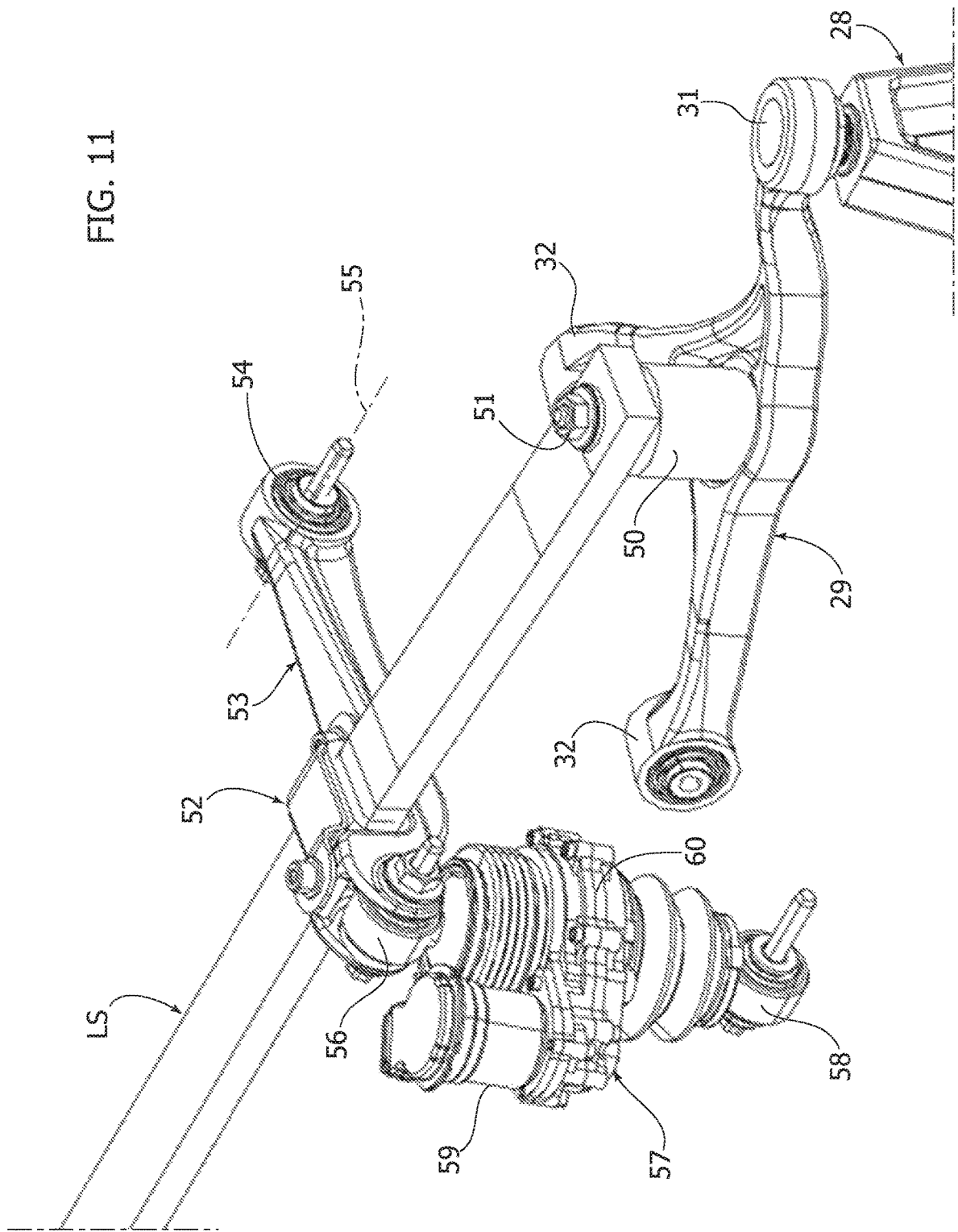
Figure 12:
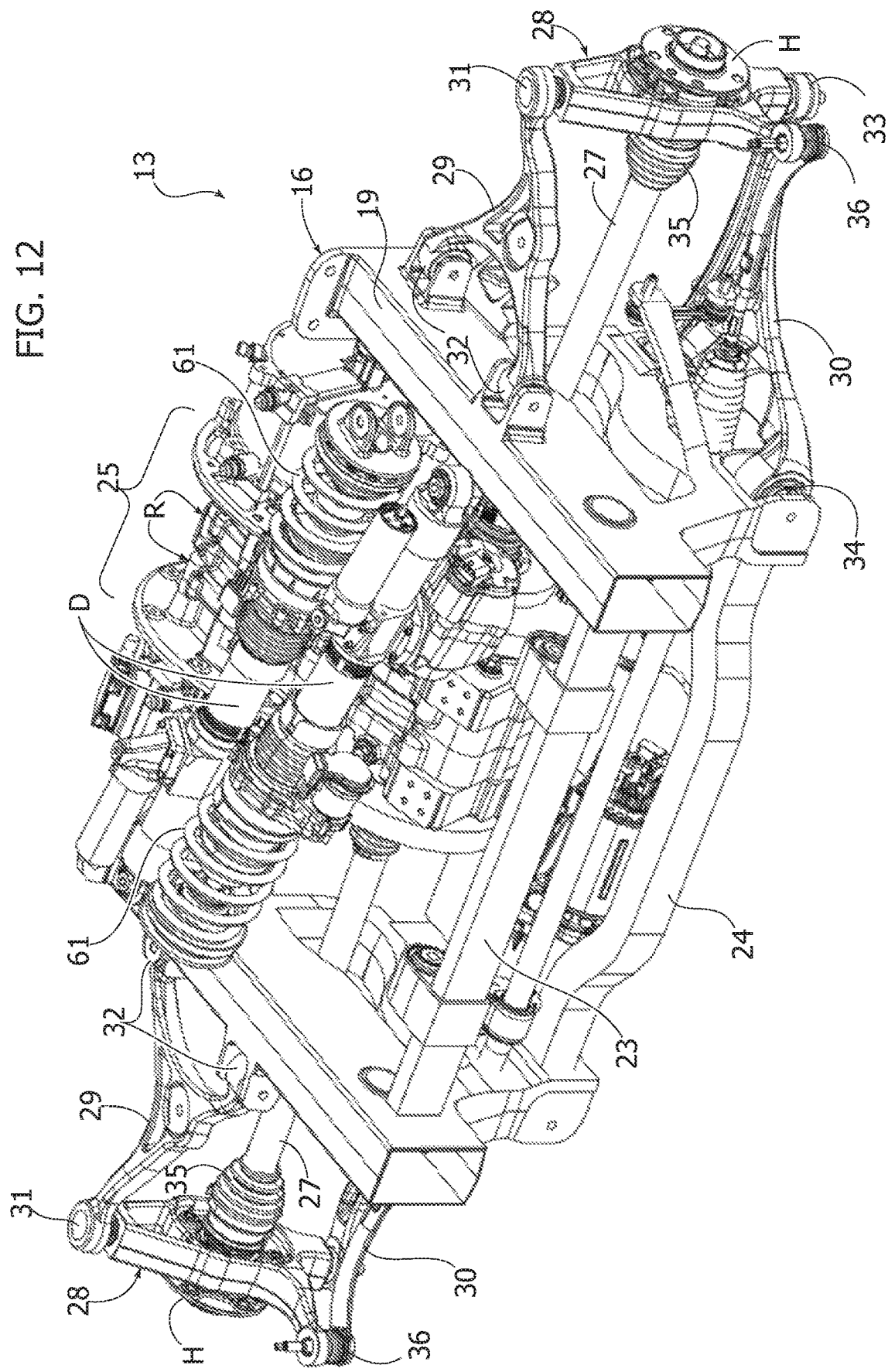
Figure 13:
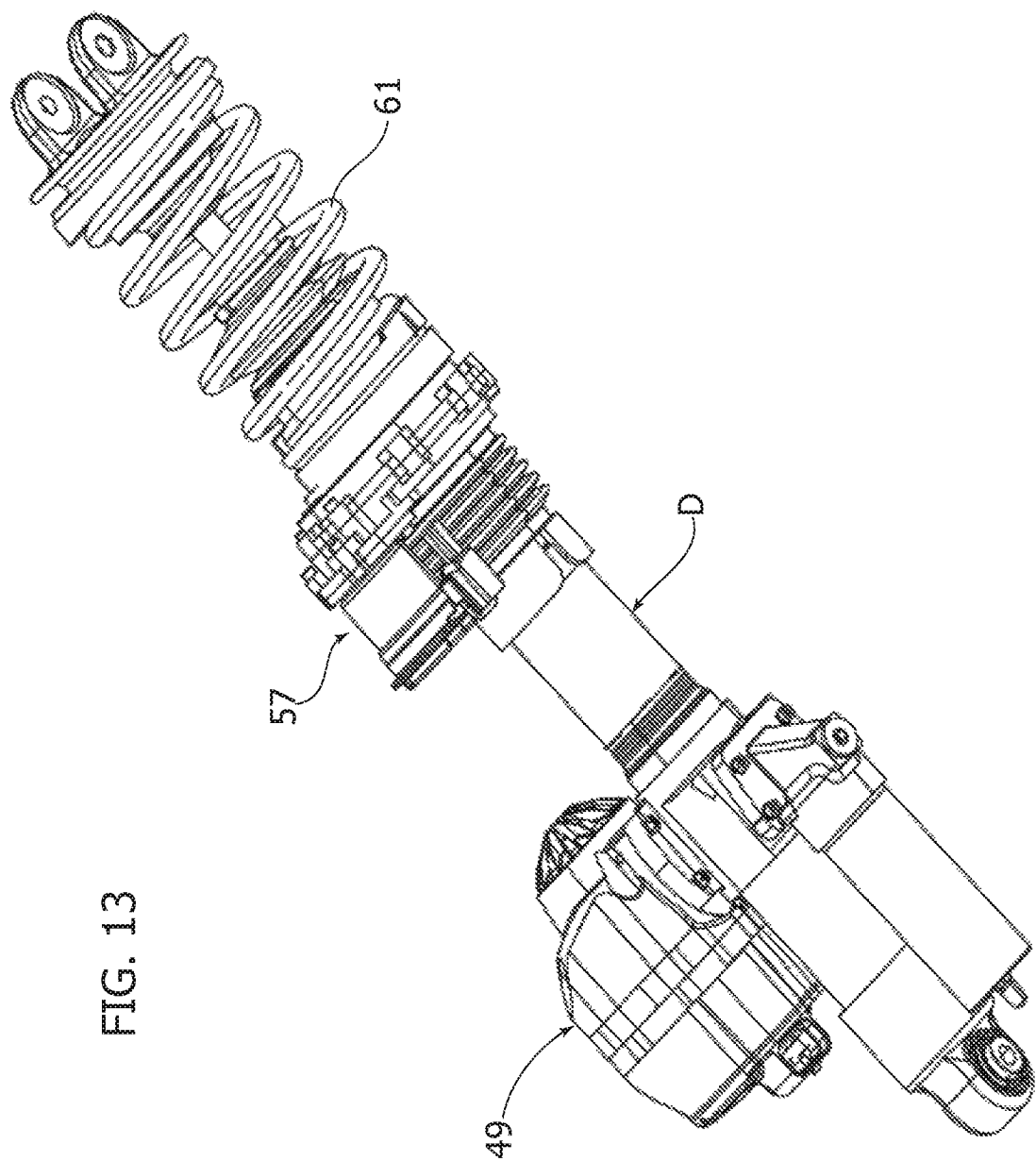
Figure 14:
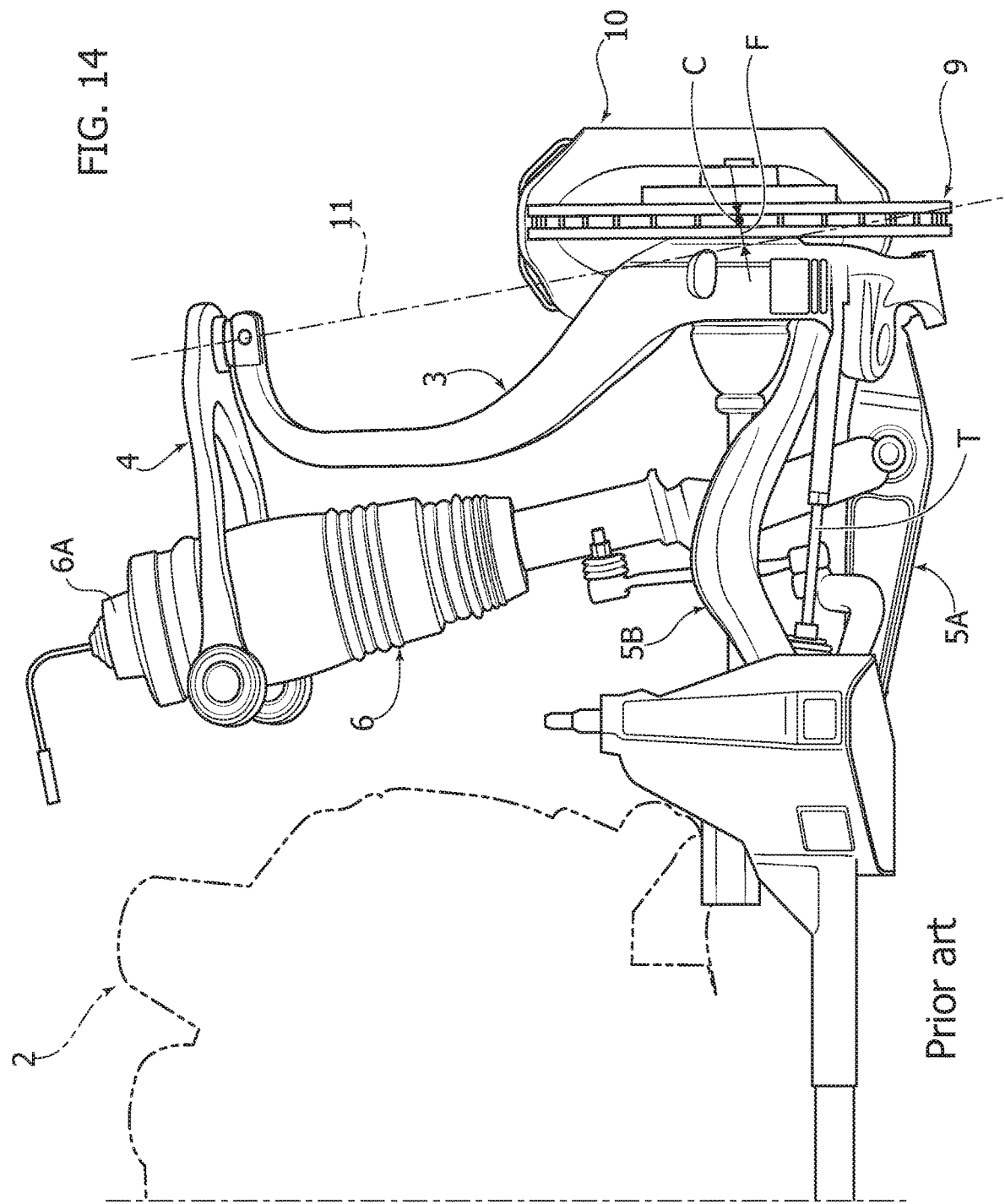
Figure 15:
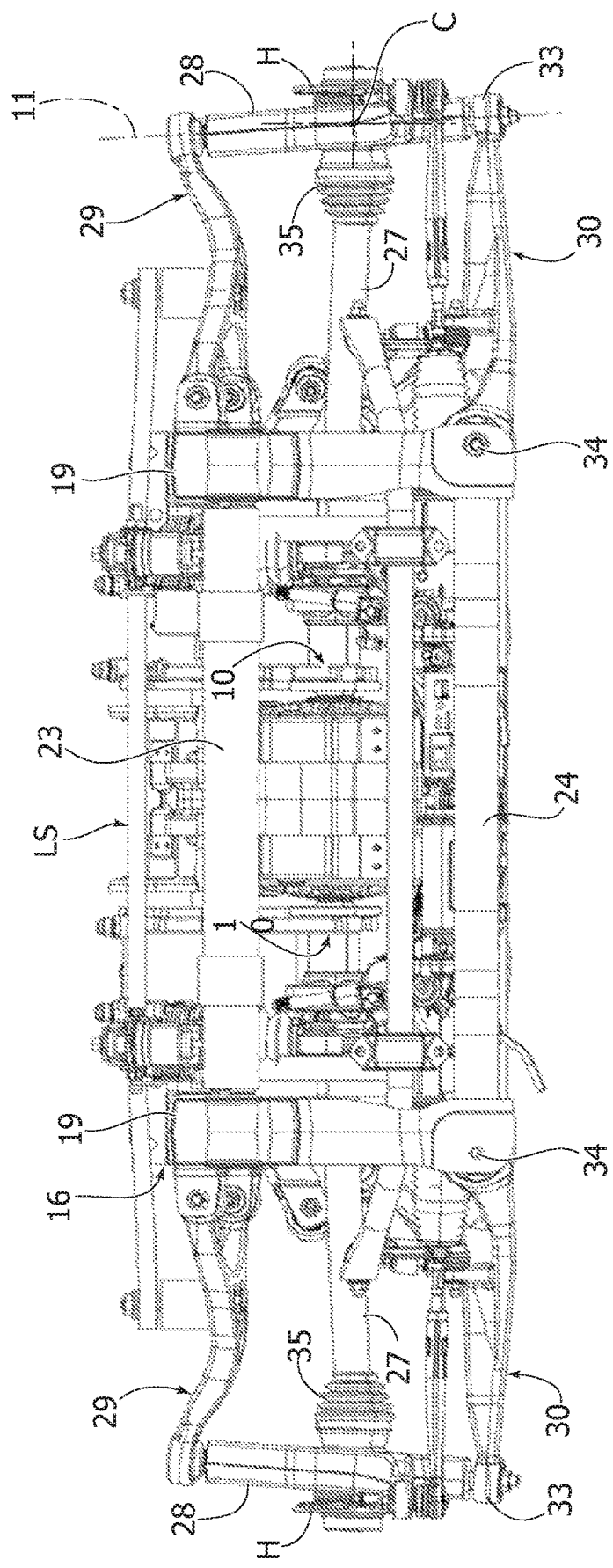

Further features and advantages of the present invention will become apparent from the following description with reference to the accompanying drawings, given purely by way of non-limiting example, in which:

FIG. 1 is a front view of a powertrain unit and a front suspension of a motor-vehicle, according to the prior art, FIG. 2 is a perspective view of a front suspension unit and an electric motor unit in an electric motor-vehicle according to the prior art, FIG. 3 is a diagrammatic lateral view of an exemplary embodiment of a motor-vehicle according to the invention, FIG. 4 is a perspective view which shows a detail of the structure of the motor-vehicle of FIG. 3, FIG. 5 is a perspective view of the suspension unit which in the motor-vehicle of FIG. 3 is used both for the front suspension and the rear suspension, FIG. 6 is a further partial perspective view from below of the unit of FIG. 5, FIG. 7 is a perspective view at an enlarged scale of some details of the unit of FIG. 5, FIG. 8 is a further perspective view from below of the unit of FIG. 5, FIG. 9 is a front view of the unit of FIG. 5, FIG. 10 is a partial perspective view from above of the unit of FIG. 5, FIG. 11 is a perspective view, at an enlarged scale of some components of the unit of FIG. 5, FIG. 12 is a perspective view of a further exemplary embodiment of the suspension unit of the vehicle according to the invention, FIG. 13 is a lateral view of a spring-damper unit forming part of the unit of FIG. 12, FIG. 14 shows a detail of FIG. 1, and FIG. 15 is a further front view of the unit of FIG. 5 in which a further preferred feature of the present invention is shown.

In FIG. 3 reference numeral 12 generally designates an embodiments of a vehicle according to the invention. Vehicle 12 is an electric vehicle. In the case of the preferred example illustrated herein, both the front wheels RA and the rear wheels RP of the vehicle 12 are powered wheels driven by a respective electric motor unit. Also in the case of the preferred example, the front suspension and the rear suspension of the vehicle 12 form part of respective units 13, 14 which are substantially identical to each other and each carrying the respective suspension system and the respective electric motor unit.

In the embodiment shown in FIGS. 3,4, the structure of the vehicle comprises a central frame module 15 and two, front and rear, frame modules 16. The two front and rear frame modules 16 are substantially identical to each other and constitute the supporting structure of the respective suspension system and the respective electric motor unit. The configuration of each of the front and rear frame modules 16 will be described in detail herein in the following. With reference to FIG. 4, which shows a partial exploded perspective view of the front unit 13 and the central module 15, the frame module 16 of the front unit 13 is connected to the front part of the central module 15 by a plurality of screws 17 which engage the frame module 16 and brackets 18 screwed or welded to the central module 15.

FIGS. 5-10 show a preferred embodiment of a unit carrying the elements of the suspension and the electric motor unit which in the illustrated example is adopted both for the front wheels RA and for the rear wheels RP. However, it is clearly apparent that the unit of FIGS. 5-9 could also be used only on the front axle or only on the rear axle of the vehicle.

With reference to the example shown in FIGS. 5-9, the frame module 16 constituting the supporting structure of unit 13 comprises two upper longitudinal beams 19 and two lower longitudinal beams 20 (only one of which is partially visible in FIG. 5).

The upper longitudinal beams 19 are connected to the lower longitudinal beams 20 by two front uprights 21 and two rear uprights 22 (see FIG. 6).

With reference to FIG. 5, the front ends of the two upper longitudinal beams 19 are connected to each other by a cross-member 23, whereas the front ends of the two lower longitudinal beams 20 are connected to each other by a cross-member 24. With reference to FIG. 6, the lower ends of the two rear uprights 22 are connected to each other by a cross-member 250.

According to a preferred feature of the present invention, the two upper longitudinal beams have a quadrangular cross-section and are to constitute, in the finally assembled motor-vehicle, the longitudinal pushrods connected to the motor-vehicle front structure, typically with the interposition of crash-box elements.

The supporting structure constituted by the frame module 16 of each units 13 or 14 carries an electric motor-unit 25 which in the illustrated example includes two electric motors M. The details of construction of the electric motors M are not described nor shown herein, since the motors M may be made according to any known art and also because these details, taken alone, do not fall within the scope of the present invention. The structure of each electric motor M is mounted on the frame module 16 with the axis of the motor directed transversely with respect to the longitudinal direction of the motor-vehicle, which in FIG. 5 is indicated by arrow A. To each electric motor M there is associated a gear reducer unit R whose housing is also supported by the frame module 16. The two electric motors M are spaced apart from each other transversally and are arranged symmetrically with respect to the vertical longitudinal plane of the motor-vehicle. The two gear reducer units R are interposed between motors M, symmetrically with respect to the above-mentioned longitudinal plane and have output shafts 26 at their opposite sides, which are connected by respective drive shafts 27 to hubs H of the two front wheels (in the case of FIG. 5) or the two rear wheels of the motor-vehicle.

The frame module 16 of unit 13 also carries all the elements of the suspension associated with the wheels of the motor-vehicle. For each wheel, a wheel support 28 is provided which is connected to the frame module 16 by an upper oscillating arm 29 and a lower oscillating arm 30. The upper oscillating arm 29 is swivelly connected to the wheel support 28 by a spherical swivel joint 31, of any known type. The upper oscillating arm 29 has a triangle-like shape, with two end inner arms which are swivelly connected to the frame module 16 around a common axis by means of two swivel joints 32. With reference to FIG. 6, also the lower oscillating arm 30 has a triangle-like configuration with an outer end connected to the wheel support 28 by means of a spherical swivel joint 33 and two inner end arms swivelly connected around a common axis to the frame module 16 by means of two swivel joints 34. The articulation axes of the two upper swivel joints 32 and the two lower swivel joints 34 on the frame module 16 are directed substantially along directions parallel to the longitudinal direction A of the motor-vehicle.

The upper swivel joint 31 and the lower swivel joint 33 of each wheel support 28 define a steering axis S of the wheel (FIG. 16), which will be discussed in the following.

Each wheel support rotatably supports the respective wheel hub, which is connected to the respective driveshaft 27 by means of a homokinetic joint 35.

To each wheel support 28 there is further connected, by means of a swivel joint 36, a steering pull-rod 37 driven by an actuator unit 38 arranged transversally with respect to the longitudinal direction of the motor-vehicle and carried by the lower part of the frame module 16 (see FIG. 6).

With reference in particular to FIGS. 6,8, the suspension unit further includes two shock absorber cylinders D. Contrary to the known solutions shown in FIGS. 1,2, in the vehicle according to the invention the shock absorber cylinders D are arranged along two directions which are substantially transverse with respect to the longitudinal direction A of the motor-vehicle. In the case of the preferred example shown in FIGS. 6,8 the two shock absorber cylinders D are arranged below the electric motor unit 25 in the lower part of the unit 13. Also in the case of the preferred example illustrated herein, the elastic means of the suspension are not constituted by helical springs associated with the shock absorber cylinders, as in the case of the known solutions of FIGS. 1,2. In this preferred example, the spring means of the suspension are indeed constituted by a single leaf spring LS, whose configuration and arrangement will be described in detail hereinafter.

Reverting to FIGS. 6,8 in the preferred example illustrated herein, the two shock absorber cylinders have ends adjacent to each other which are pivotally mounted by swivel joints 38 to a bracket 39 projecting in a cantilever fashion from the lower cross-member 250. At the end opposite to joint 38 of the body of each shock absorber cylinder D there extends a stem which is operatively connected to the respective lower oscillating arm 30 of the suspension, in the way which will be described in the following. The stem of each shock absorber cylinder D is connected in particular by means of a swivel joint 40 to a linkage member 41 (see also FIG. 7) having substantially a triangle-like configuration. The oscillating linkage member 41 has a first portion 42 pivotally mounted around a substantially longitudinal axis 43 on the frame module 16. A second portion 44 of the oscillating linkage member 41 is connected by means of the swivel joint 40 to the stem of the respective shock absorbers cylinder D. A third portion 45 of the oscillating linkage member 41 (see FIG. 7) is connected by means of an articulated rod 46 to the respective lower oscillating arm 30. The articulated rod 46 has its ends respectively articulated to the portion 45 of the linkage member 41 and the lower oscillating arm 30.

Due to the above described arrangement, shown at an enlarged scale in FIG. 7, the movements of the suspension are transmitted by the lower oscillating arm 30 to the respective shock absorber cylinder D by means of the articulated rod 46 and the oscillating linkage member 41.

Further, the position of maximum shortening of the shock absorber cylinder D is defined by engagement of a disc plate 47 carried by the portion 45 of the oscillating linkage member 41 against a rubber pad member 48 carried by the frame module 16.

As it will become apparent from the foregoing description, in the motor-vehicle according to the invention the space available inside the engine compartment, due to that the motor-vehicle is provided with an electric motor unit rather than with a conventional power unit including an internal combustion engine and the gearbox associated therewith, is advantageously used to avoid an arrangement of the shock absorber cylinders D in a conventional vertical position (FIGS. 1, 2) which poses limits to the minimum height of the front suspension of the motor-vehicle.

In a preferred embodiment, with each shock absorber cylinder D there is associated, in a way known per se, an actuator unit 49 (see FIGS. 6 and 8) including, in a way known per se, an electric motor and a pump able to cause the respective shock absorbers cylinder D to operate as an active hydraulic cylinder, in order to provide a suspension active control. In this case, cylinders D can be used to automatically cause a determined vertical movement of the motor-vehicle wheels in determined travel conditions. The actuator units 49 are controlled by solenoid valves which are controlled by an electronic controller according to a predetermined logic, as a function of determined operating conditions. For example, the electronic controller may be programmed to automatically cause, with a reaction time in the order of a few milliseconds, a raising movement of the wheels with respect to the vehicle structure as soon as sensors provided for these purpose detect engagement of the wheel against an obstacle, so as to enable the wheel to overcome the obstacle without causing any substantial movement of the vehicle structure in the vertical direction.

The horizontal arrangement of the shock absorber cylinders D which is provided in the case of the motor-vehicle according to the invention also enables each actuator unit 49 to be arranged with no problems of available space, contrary to what happens in conventional suspensions of the type shown in FIGS. 1,2, in which the actuator unit associated with the shock absorbers cylinder involves problems of interference with the wheels support during steering of the wheel.

As already indicated above, in the preferred example illustrated herein, the elastic means of the suspension are constituted by a transverse leaf spring LS whose ends are connected by means of damping supports 50 to two oscillating upper arms 29 (FIG. 10).

In the illustrated example, each damping support 50 has a screw 51 for connection of the leaf spring LS to the arm 29 with the interposition of a cylinder of elastomeric material.

In the simplest solution, the central portion of the transverse leaf spring LS is rigidly connected to the frame module 16. However, in the preferred example shown in FIGS. 10-12, the central portion of the leaf spring LS is rigidly connected by means of a clamping device 52 to the end of a lever 53 pivotally mounted by means of an elastic bush 54 to the frame module 16 around a transverse axis 55. The end of the lever 53 connected to the leaf spring LS is further connected by means of an elastic bush 56 to the end of a linear actuator 57 whose opposite end is pivotally connected by means of an elastic bush 58 to the frame module 16. The axes of elastic bushes 56, 58 are also directed transversally. The actuator unit 57 includes an electric motor 59 which drives a screw-and-nut actuator by means of a gear reducer unit, whose housing is designated by 60. The actuator unit 57 enables the height of the clamping device 52 to be varied with respect to axis 55 of the articulation to the frame module 16. Therefore, when the two levers 53 are raised, the entire transverse leaf spring LS is raised, causing a corresponding raising movement of the arms 29 and the wheel supports 28 with respect to the frame module 16. The possibility of an adjustment of the height of the motor-vehicle with respect to the ground is thereby obtained, which can be useful for example for shifting from a configuration adapted to a normal driving mode to a configuration adapted to a sport driving mode.

FIG. 12 shows an alternative embodiment, in which the two shock absorber cylinders D are in a horizontal position above the suspension unit, arranged side-by-side in the space between the two upper longitudinal beams 19. In this case the spring means of the suspension are of a conventional type, i.e. they are constituted by helical springs coaxially associated with the shock absorber cylinders. Furthermore, in this case, according to a technique known per se, with the shock absorber cylinder there is associated both the actuator unit 49 for operating the cylinder as an active hydraulic cylinder, and the actuator unit 57 for the adjustment of the height of the motor-vehicle with respect to the ground. In this case, the actuator unit 57 varies the axial position of the disc plate on which one end of the helical spring 61 associated with the shock absorber cylinder D is supported. FIG. 14 shows a detail of FIG. 1 and relates to a known front suspension of a motor-vehicle provided with an internal combustion engine 2. The presence of the brake disc 9 and the associated caliper 10 adjacent to the wheel hub implies that the steering axis 11 of the wheel, defined by the swivel joints connecting the wheel support 3 to the upper oscillating arm 4 and the lower oscillating arm 5 (in the illustrated example two lower arms 5A,5B are provided which define a semi-virtual steering axis, passing through the point of connection of the wheel support 3 to the upper oscillating arm 4 and through a point defined by the intersection of the two median axes of the two lower oscillating arms 5A,5B) which do not pass through the wheel centre C. In the actual case shown the distance F between axis 11 and the wheel centre C is 45 mm. This distance (also called "kingpin offset") generates drawbacks, above all when the internal combustion engine is replaced by an electric motor able to transmit very high torques to the wheels of the motor-vehicle. In this case, the kingpin offset is at the origin of stresses on the steering pull-rod T and hence on the toothed rack of the steering device, thus causing unacceptable shocks on the steering wheel.

In the exemplary embodiment of the invention which is shown in FIGS. 5-10 and 15, which has been described in the foregoing, it is further provided that the brake discs 9 (see also the solution shown in FIG. 4) are mounted directly at the outputs 26 of the two electric motors M and connected to respective wheel hubs H by drive shafts 27. This arrangement is made possible by the relevant space available in the engine compartment due to the elimination of the internal combustion engine. The frame of module 16 also supports the calipers 10 associated with discs 9. Avoiding to arrange the brake discs and the brake calipers adjacent to the wheel hubs H renders possible to arrange the upper and lower oscillating arms 29, 30 and respective swivel joints 31, 33 so as to define a steering axis 11 passing exactly through the wheel centre C, so as to overcome the above described drawback. A further advantage of this arrangement lies in that the result of a steering axis 11 passing through the wheel centre C can be obtained with a "low" quadrilateral, i.e. by arranging the upper oscillating arm 29 at a relatively low position with respect to the ground and with respect to the wheel, differently from what happens in the known solution of FIG. 1, where, in order to keep axis 11 as close as possible to the wheel centre C (FIG. 14) the connecting point between the wheel support 3 and the upper oscillating arm 4 is arranged very high with respect to the ground and with respect to the wheel. This generates the further drawback of posing a further limit to the possibility of having a relatively low profile of the motor car with respect to the ground in the front part of the motor car.

Naturally, while the principle of the invention remains the same, the embodiments and the details of construction may widely vary with respect to what has been described purely by way of example without departing from the scope of the invention as defined in the annexed claims.

What is claimed is:

1. An electric vehicle, comprising a suspension and powertrain unit which includes:
    a frame module,
    an electric motor unit carried by said frame module centrally between two wheels, and
    a suspension including, for each wheel:
        an upper oscillating arm and a lower oscillating arm each having a first end portion swivelly connected to a respective wheel support by a first swivel joint and a second end portion swivelly connected to the frame module by at least one second swivel joint, so that each wheel support is rotatable around a steering axis defined by the swivel joints connecting the respective wheel support to the upper and lower oscillating arms,
        wherein each wheel support rotatably supports a respective wheel hub which is connected to said electric motor unit by a respective drive shaft,
        and wherein two brake discs are connected in rotation with the two wheel hubs,
    wherein:
        said brake discs are mounted on two power outputs of the electric motor unit adjacent to two sides of the electric motor unit and at a distance from the respective wheels, said brake discs being connected by respective drive shafts to the wheel hubs of the two wheels,
        brake calipers cooperating with said brake discs are carried by said frame module adjacent to the two sides of the electric motor unit,
        the swivel joints connecting each wheel support to the respective upper and lower oscillating arms define a steering axis passing through respective wheel centers of the two wheels and thereby having a zero kingpin offset,
    wherein said suspension and powertrain unit further includes:
        two shock absorber cylinders arranged in substantially horizontal positions and along two directions substantially transversal with respect to a longitudinal direction of the vehicle, below or above said electric motor unit, wherein:
            each shock absorber cylinder has a first end connected to said frame module and a second end operatively connected to one of said upper and lower oscillating arms of the respective wheel by an oscillating linkage member,
            said oscillating linkage member comprises a first portion pivotally connected to said frame module at a location separate from the second end of the oscillating arms, a second portion connected to said second end of the respective shock absorber cylinder and a third portion pivotally connected to one of said upper and lower oscillating arms by a respective articulated rod, the second portion being free from connection to the articulated rod and the oscillating arms,
        wherein said suspension comprises a spring arrangement in the form of a single leaf spring arranged transversely with respect to the longitudinal direction of the vehicle and having a central portion connected to the frame module of the suspension and end portions connected to the respective upper oscillating arms at a position between their respective first and second end portions, and wherein the end portions of said leaf spring are connected to the respective upper oscillating arms of the suspension by elastic supports.

2. The electric vehicle according to claim 1, wherein the electric motor unit carried by said frame module comprises two electric motors arranged coaxially according to a transverse direction with respect to a longitudinal direction of the vehicle and at positions spaced apart from each other and symmetrical with respect to a median line of the vehicle, and two respective gear reducer units arranged centrally between the two electric motors, with housings having lateral walls from which project respective output shafts carrying said brake discs and connected by said drive shafts to the wheel hubs of the two wheels.

3. The electric vehicle according to claim 1, wherein the frame module is in the form of a lattice framework, having two upper longitudinal beams and two lower longitudinal beams connected to each other by uprights and cross-members, and wherein the upper longitudinal beams constitute push-rods adapted to absorb impact energy following a front collision of the vehicle in its use.

4. The electric vehicle according to claim 3, further comprising a modular supporting structure including a central frame module and front and rear frame modules removably connected to a respective front end and rear end of said central frame module, the frame module being one of the front and rear frame modules, and wherein said front and rear frame modules are identical to each other and each carry one electric motor unit and one suspension unit identically configured and arranged.

5. The electric vehicle according to claim 1, wherein with each shock absorber cylinder there is associated an actuator device for a suspension active control, wherein said leaf spring has its central portion carried by the frame module so as to be adjustable in height, and wherein with said leaf spring there is associated another actuator device for adjustment of a position in height of the central portion of the leaf spring.

6. The electric vehicle according to claim 5, wherein the central portion of said leaf spring is carried by two arms pivotally mounted around a common axis on the frame module by elastic bushes and having opposite ends connected to ends of two respective actuator devices.

7. The electric vehicle according to claim 1, wherein with each shock absorber cylinder there is associated a pad member cooperating operatively with the shock absorber cylinder to define an end-of-travel position of minimum length of the shock absorber cylinder, said pad member been mounted on said frame module and being adapted to cooperate with a disc plate carried by said oscillating linkage member.

8. The electric vehicle according to claim 1, wherein said suspension comprises a spring arrangement constituted by helical springs respectively associated to said two shock absorber cylinders.

9. The electric vehicle according to claim 1, wherein with each shock absorber cylinder there is associated an actuator device for a suspension active control and another actuator device for adjustment of a position in height of the vehicle.

\* \* \* \* \*